US009197721B2

(12) United States Patent
Zhou

(10) Patent No.: US 9,197,721 B2
(45) Date of Patent: Nov. 24, 2015

(54) LEARNING A MAC ADDRESS

(71) Applicant: Hangzhou H3C Technologies Co., Ltd., Hangzhou (CN)

(72) Inventor: Wan Zhou, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 14/236,033

(22) PCT Filed: Sep. 27, 2012

(86) PCT No.: PCT/CN2012/082149
§ 371 (c)(1),
(2) Date: Jan. 29, 2014

(87) PCT Pub. No.: WO2013/044821
PCT Pub. Date: Apr. 4, 2013

(65) Prior Publication Data
US 2014/0198808 A1  Jul. 17, 2014

(30) Foreign Application Priority Data

Sep. 29, 2011  (CN) .......................... 2011 1 0291273

(51) Int. Cl.
*H04L 12/747* (2013.01)
*H04L 29/12* (2006.01)
*H04L 29/06* (2006.01)
(Continued)

(52) U.S. Cl.
CPC .......... *H04L 69/22* (2013.01); *H04L 29/12811* (2013.01); *H04L 29/12839* (2013.01); *H04L 49/15* (2013.01); *H04L 61/103* (2013.01);
(Continued)

(58) Field of Classification Search
None
See application file for complete search history.

(56) References Cited

U.S. PATENT DOCUMENTS

| 6,393,484 B1 * | 5/2002 | Massarani ...................... 709/227 |
| 2006/0129695 A1 * | 6/2006 | Faibish et al. ................. 709/245 |

(Continued)

FOREIGN PATENT DOCUMENTS

| CN | 1881929 | 12/2006 |
| CN | 101075933 | 11/2007 |

(Continued)

OTHER PUBLICATIONS

CN First Office Action dated Aug. 5, 2013 issued on CN Patent Application No. 201110291273.2 dated Sep. 29, 2011, The State Intellectual Property Office, P. R. China.

(Continued)

*Primary Examiner* — Omar Ghowrwal
(74) *Attorney, Agent, or Firm* — Mannava & Kang, P.C.

(57) ABSTRACT

A method and an edge device for learning a Medium Access Control (MAC) address are provided. According to an example, based on a request message from a first node to a second node, a session cache item is created in the edge device. The session cache item includes: IP addresses of the first and second nodes, and a first relationship between a MAC address of the first node and an output port corresponding to the first node. Based on a response message from the second node to the first node, the session cache item is updated to include a second relationship between a MAC address of the second node and an output port corresponding to the second node. The first and second relationships are then provided to a data plane of the edge device to facilitate data packet forwarding between the first node and the second node.

15 Claims, 6 Drawing Sheets

(51) Int. Cl.
*H04L 12/933* (2013.01)
*H04L 12/46* (2006.01)

(52) U.S. Cl.
CPC ........ *H04L61/6009* (2013.01); *H04L 61/6022* (2013.01); *H04L 12/4633* (2013.01)

(56) References Cited

U.S. PATENT DOCUMENTS

| | | |
|---|---|---|
| 2008/0219273 A1 | 9/2008 | Kaneko |
| 2010/0226376 A1* | 9/2010 | Mohan et al. ............ 370/395.53 |
| 2013/0051232 A1* | 2/2013 | Gavrilov et al. .............. 370/235 |
| 2013/0185416 A1* | 7/2013 | Larkin et al. ................. 709/224 |

FOREIGN PATENT DOCUMENTS

| | | |
|---|---|---|
| CN | 101098291 | 1/2008 |
| CN | 101488964 | 7/2009 |
| CN | 102118316 | 7/2011 |
| CN | 102143068 | 8/2011 |
| CN | 102291320 | 12/2011 |
| WO | WO-2009003394 | 1/2009 |

OTHER PUBLICATIONS

International Search Report and Written Opinion dated Jan. 3, 2013 issued on PCT Patent Application No. PCT/CN2012/082149 dated Sep. 27, 2012, The State Intellectual Property Office, the P. R. China.

* cited by examiner

LEARNING A MAC ADDRESS

CLAIM FOR PRIORITY

The present application is a national stage filing under 35 U.S.C 371 of PCT application number PCT/CN2012/082149, having an international filing date of Sep. 27, 2012, which claims priority to Chinese patent application number 201110291273.2, filed on Sep. 29, 2011, the disclosures of which are hereby incorporated by reference in their entirety.

BACKGROUND

In order to provide better services, service providers usually deploy multiple data centers in different locations, so as to implement load balancing and achieve high availability, and further to realize random migration of virtual machines between the data centers. Since the migration of the virtual machines is transparent to users, Internet Protocol (IP) addresses and Media Access Control (MAC) addresses of the virtual machines should not change. Therefore, layer-2 interconnection between data centers located in different locations is desirable.

BRIEF DESCRIPTION OF THE DRAWINGS

Features of the present disclosure are illustrated by way of example and not limited in the following figure(s), in which like numerals indicate like elements, in which.

DETAILED DESCRIPTION

Hereinafter, the present disclosure will be described in further detail with reference to the accompanying drawings and examples.

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

Figure 1:
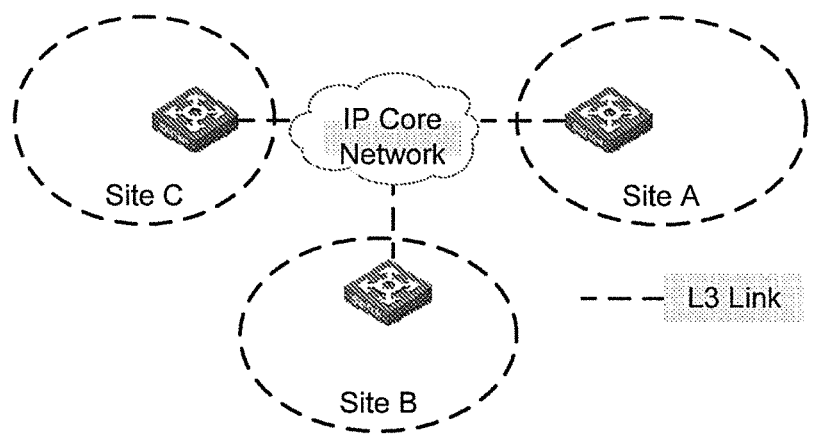
FIG. 1 is a schematic diagram illustrating a conventional network structure of layer-2 interconnection of data centers.

FIG. 1 is a schematic diagram illustrating a conventional network structure of a layer-2 interconnection of data centers. In the network structure shown in FIG. 1, there are three sites: site A, site B, and site C. A data center is deployed in each site and is connected to an IP core network through an Edge Device (ED) of the data center, so as to realize layer-2 interconnection of the data centers.

In the network structure shown in FIG. 1, each ED needs to learn the MAC addresses of all of the hosts in all of the Virtual Private Networks (VPNs) of each site. An ED may be a network device such as a router, routing switch, switch, multiplexer etc. A host is a node that is connected to the network via an ED, such as a host computing device, routing device, and portable communications device etc.

Figure 2:
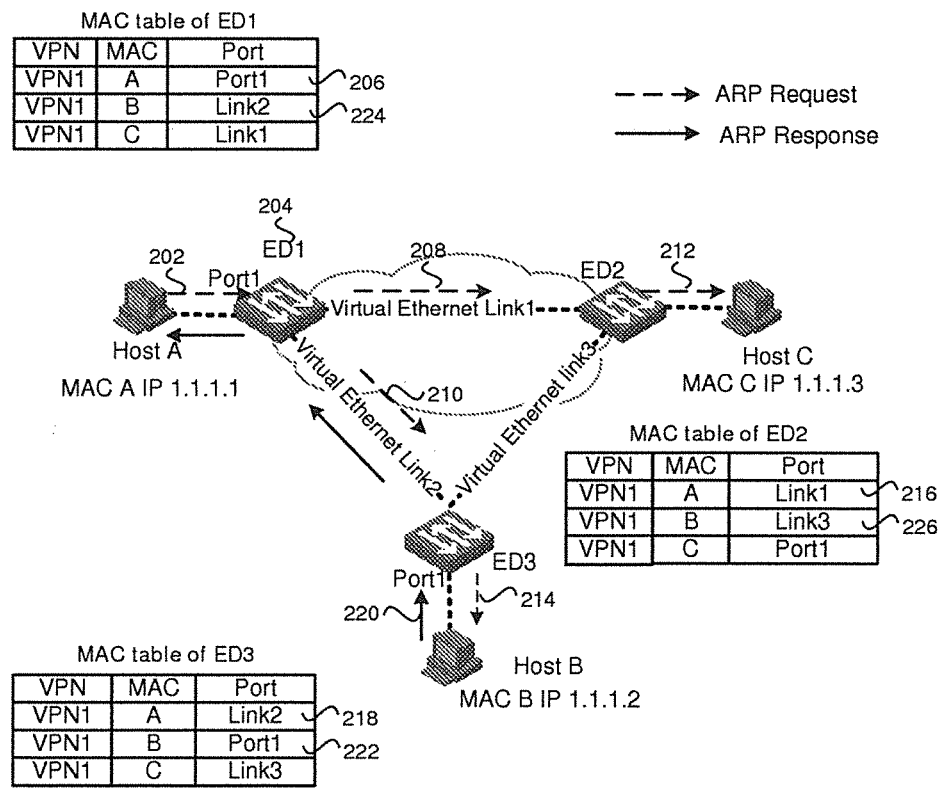
FIG. 2 is a schematic diagram illustrating a conventional MAC address learning process.

FIG. 2 is a schematic diagram illustrating a conventional MAC address learning process. As shown in FIG. 2, it is supposed that a MAC address forwarding table in each of Edge Devices ED1, ED2, and ED3 shown in FIG. 2 is initially null. Consider the case where host A in VPN 1 of ED1 needs to communicate with host B in VPN 1 of ED3. The MAC address of host A is MAC_A, and the IP address of host A is IP_A (e.g., 1.1.1.1). Host A knows only the IP address of host B (i.e., IP_B, e.g., 1.1.1.2) but not the MAC address of host B. Thus, host A needs to learn the MAC address of host B in order to communicate with host B using the MAC address of host B.

The MAC address learning process according to an example in conventional systems is as follows.

Firstly, host A broadcasts an Address Resolution Protocol (ARP) request message in a Virtual Local Area Network (VLAN) to learn the MAC address of host B; see 202. The ARP is a protocol for resolution of network layer (layer-3) addresses into link layer (layer-2) addresses, A Target IP address in the ARP request message is IP_B, a Sender IP address in the ARP request message is IP_A, a Sender MAC address is MAC_A. The Sender of the ARP request message is a device that initially transmits the ARP request message, which is host A in this example.

The ARP request message arrives at ED1 of the site where host A is initially located; see 204 in FIG. 2. When the ARP request message broadcasted by host A is received, ED1 learns the Sender MAC address of the ARP request message (i.e., MAC_A), and advertises the learnt MAC_A to ED2 and ED3. Any suitable protocol may be used for the advertisement, such as the Intermediate System to Intermediate System (ISIS) protocol etc. ED1 adds an item or entry about MAC_A in a local MAC address forwarding table that includes: VPN is VPN1, MAC address is MAC_A, output port is Port1 (the port through which the ARP request message was received by ED1, since host A and ED1 are in the same site, and Port1 is a local port at ED1); see 206 in FIG. 2.

The ARP request message also arrives at ED2 and ED3; see 208 and 210 in FIG. 2 respectively. After the ARP request message is received, ED2 and ED3 broadcast the ARP request message to hosts under them; see 212 and 214 in FIG. 2 respectively.

In addition, ED2 and ED3 learn the MAC_A advertised by ED1 using ISIS. After MAC_A advertised by ED1 using ISIS is learnt, ED2 and ED3 respectively add an item about MAC_A in their respective local MAC address forwarding tables. More specifically, the item about MAC_A added by ED2 in its local MAC address forwarding table includes: VPN is VPN1, MAC address is MAC_A, output port is Link1 (Link1 denotes the port through which MAC_A was learnt by ED2, since ED1 and ED2 are in different sites, this port corresponds to a VLAN link between ED2 and ED1); see 216 in FIG. 2. The item about MAC_A added by ED3 in the local MAC address forwarding table of ED3 includes: VPN is VPN1, MAC address is MAC_A, output port is Link2 (Link2 denotes the port through which MAC_A was learnt by ED3, since ED1 and ED3 are in different sites, this port corresponds to a VLAN link between ED3 and ED1); see 218 in FIG. 2.

After the ARP request message is received, host B finds that the Target IP address of the ARP request message is the IP address of host B and returns an ARP response message; see 220 in FIG. 2. A Target MAC address of the ARP response message is MAC_A, a Target IP address is IP_A, a Sender IP address is IP_B and a Sender MAC address is MAC_B, wherein the Sender of the ARP response message is a device that initiates the ARP response message.

For other hosts such as host C, since the Target IP address of the ARP request message is not their IP address, they do not respond to the ARP request message.

The ARP response message transmitted by host B arrives at ED3 of the site where host B is located. When the ARP response message is received, ED3 learns the Sender MAC address (i.e., MAC_B) of the ARP response message, and adds an item about MAC_B in the local MAC address forwarding table of ED3: VPN is VPN1, MAC address is MAC_B, output port is Port1 (which is a local port through which the ARP response message was received by ED3); see 222 in FIG. 2.

ED3 searches the local MAC address forwarding table for an output port corresponding to the Target IP address. Since the Target IP address is the IP address of host A, according to the item added by ED3 in the local MAC address forwarding table according to the ARP request message broadcasted by host A, ED3 is able to determine that the output port for the Target IP address is Link2; see 218 in FIG. 2 again. Thus, ED3 transmits the ARP response message through Link2. At the same time, ED3 advertises MAC_B to ED1 and ED2 using ISIS, such that ED1 and ED2 may add an item about MAC_B in their local MAC address forwarding tables; see 224 and 226 in FIG. 2.

After MAC_B advertised by ED3 is learnt, ED1 adds an item about MAC_B in the local MAC address forwarding table: VPN is VPN1, MAC address is MAC_B, output port is Link2 (the port through which MAC_B was learnt by ED1, in particular, the port corresponds to a virtual Ethernet link between ED1 and ED3); see 224 in FIG. 2.

After the ARP response message transmitted by ED3 is received, ED1 searches the local MAC address forwarding table for an output port corresponding to the Target IP address. According to the item 206 added by ED1 in the local MAC address forwarding table according to the ARP request message broadcasted by host A, ED1 determines that the output port for the Target IP address is Port1. Thus, ED1 transmits the ARP response message through Port1 to host A.

After the ARP response message is received, host A knows the MAC address of the Target, i.e., host B. Thereafter, host A may initiate communication with host B.

Now, the MAC address learning process in the example in FIG. 2 is finished.

In the example in FIG. 2, network nodes or entities that really need to communicate are host A and host B. Therefore, only ED1 in the site of host A and ED3 in the site of host B need to learn the MAC address of host A and host B respectively. ED2 does not need to learn the MAC address of host A and the MAC address of host B. In other words, ED1 does not need to advertise MAC_A to ED2 using ISIS, and ED3 does not need to advertise MAC_B to ED2 using ISIS, either. Further, ED2 does not need to create items about MAC addresses of host A and host B in the local MAC address forwarding table; see 216 and 226 in FIG. 2. It can be seen that, the existing MAC address learning method according to FIG. 2 greatly wastes resources of ED2 which stores unnecessary MAC address items in its forwarding table. In addition, since ED1 advertises MAC_A to ED2 using ISIS and ED3 advertises MAC_B to ED2, resources of other EDs are also wasted.

In contrast to the above, one or more examples of the present disclosure provide a method and an edge device for learning a MAC address, so as to increase resource utilization in an ED and reduce unnecessary storage of MAC address items.

According to an example, disclosed herein is a method for learning a MAC address, applied in an ED in a layer-2 virtual interconnection network of data centers. The method includes:

based on an ARP request message from a first node to a second node, creating in a control plane of the ED a session cache item, wherein the session cache item includes: (i) IP address of the second node, (ii) IP address of the first node, and (iii) a first relationship between a MAC address of the first node and an output port corresponding to the MAC address of the first node;

based on an ARP response message from the second node to the first node, updating the session cache item having the IP address of the first node and the IP address of the second node, wherein the updated session cache item further includes: (iv) a second relationship between a MAC address of the second node and an output port corresponding to the MAC address of the second node, forwarding the ARP response message via the output port corresponding to the MAC address of the first node in the first relationship in the session cache item; and providing the first relationship and the second relationship to a data plane of the edge device to facilitate data packet forwarding between the first node and the second node.

According to another example, disclosed herein is a method for learning a MAC address, applied to an ED in a layer-2 interconnection between data centers. The method including:

capturing an ARP request message, creating in a control plane a session cache item containing: a Target IP address of the ARP request message, a Sender IP address of the ARP request message, a Sender MAC address of the ARP request message, and an output port corresponding to the Sender MAC address;

capturing an ARP response message, finding, in created session cache items, a session cache item containing: a Target IP address and a Sender IP address of the ARP response message, adding a Sender MAC address of the ARP response message and an output port corresponding to the Sender MAC address of the ARP response message to the session cache item found, forwarding the ARP response message through the output port corresponding to the Sender MAC address of the ARP request message in the session cache item; and providing or issuing a relationship between the Sender MAC address and the output port of the ARP request message in the session cache item and a relationship between the Sender MAC address and the output port of the ARP response message in the session cache item to a data plane to instruct or facilitate data packet forwarding; or advertising a local MAC address in the session cache item through the output port corresponding to a remote MAC address in the session cache item, receiving a MAC address advertised by another ED, and issuing or providing a relationship between the MAC address received and a port through which the MAC address was received to a data plane to instruct data packet forwarding.

Figure 3:
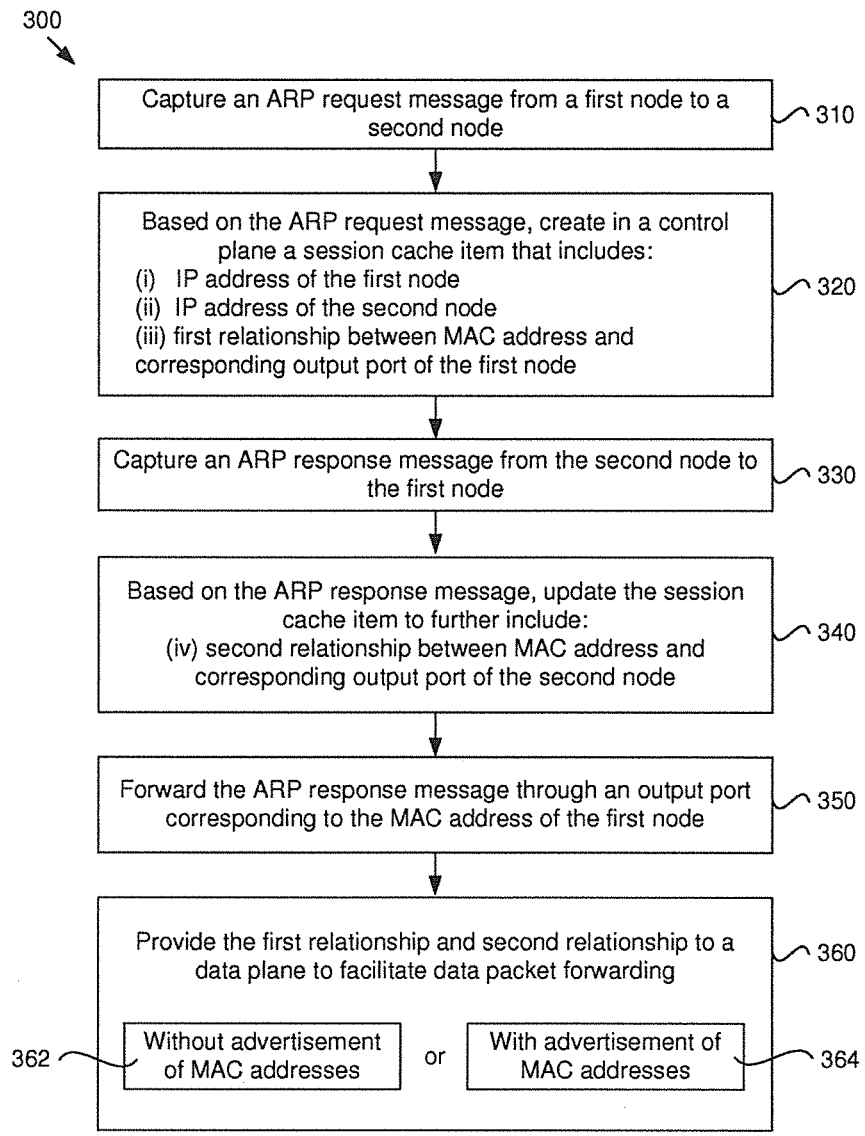
FIG. 3 is a flowchart illustrating a method according to an example of the present disclosure.

FIG. 3 is a flowchart 300 illustrating a method according to an example of the present disclosure. The example method depicted in FIG. 3 is applied in a layer-2 interconnection network between data centers including at least two sites. In the layer-2 interconnection network, each ED is enabled with an ARP snooping function for snooping or capturing all ARP messages forwarded by the ED. An ARP message may be an ARP request message, an ARP response message, a gratuitous ARP message broadcasted by a host migrated to a new site, etc., which is not restricted in the present disclosure.

Based on the above, the operations performed by each ED according to an example of the present disclosure include the following.

At block 310 in FIG. 3, an ARP request message from a first node to a second node is captured by the ED. One of the first node and the second node is a local node of the ED, while the other node is a remote node of the ED.

At block 320 in FIG. 3, the ED creates a session cache item in a control plane of the ED based on the ARP request message from the first node to the second node. The created session cache item includes:

(i) an IP address of the second node, that is a Target IP address of the ARP request message;
(ii) an IP address of the first node, that is a Sender IP address of the ARP request message;
(iii) Relationship ("first relationship") between the MAC address of the first node and its corresponding output port. The MAC address of the first node is a Sender MAC address of the ARP request message from the first node; and its corresponding output port is an output port corresponding to the Sender MAC address of the ARP request message.

For facilitating the description, in block 310, the output port corresponding to the Sender MAC address of the ARP request message is also referred to as a first output port. The first output port may be a port through which the ARP request message is received, such that a message may be transmitted to the Sender MAC address through the port. The first output port may be a local port or a port corresponding to a virtual Ethernet link. For example:

If the ARP request message is broadcasted by a first node such as a host or routing device located in a local site, the Sender MAC address of the ARP request message is a local MAC address, and the first output port corresponding to the Sender MAC address is a local port.

If the ARP request message is broadcasted by a first node such as a host or routing device located in a remote site, the Sender MAC address of the ARP request message is a remote MAC address, and the first output port corresponding to the Sender MAC address is a port corresponding to a virtual Ethernet link between a local ED and the remote ED.

At block 330 in FIG. 3, an ARP response message from the second node to the first node is captured.

At block 340 in FIG. 3, the session cache item having the IP address of the first node and the IP address of the second node is updated. The session cache item is updated to further include:

(v) Relationship ("second relationship") between the MAC address of the second node and its corresponding output port. The MAC address of the second node is the Sender MAC address of the ARP response message from the second node; and its corresponding output port is the output port corresponding to the Sender MAC address of the ARP response message.

Block 340 may include finding, in created session cache items, the session cache item with the Target IP address and the Sender IP address of the ARP response message before updating the found session cache item.

At block 350 in FIG. 3, the ARP response message is forwarded through the first output port in the session cache item, that is the output port corresponding to the MAC address of the first node. Then block 360 is performed.

The ARP response message from the second node to the first node in blocks 330 to 350 is a response to the ARP request message from the first node.

For facilitating the description, the output port corresponding to the Sender MAC address of the ARP response message is referred to as a second output port, in which the second output port may be a port through which the ARP response message was received, such that a message may be transmitted to the Sender MAC address of the ARP response message through this port. Similar to the first output port, the second output port may be a local port or a port corresponding to a virtual Ethernet link. For example:

If the ARP response message is unicasted by a second node such as host or routing device located in a local site, the Sender MAC address of the ARP response message is a local MAC address and the second output port corresponding to the Sender MAC address is a local port.

If the ARP response message is unicasted by a second node such as a host or routing device located in a remote site, the Sender MAC address of the ARP response message is a remote MAC address and the second output port corresponding to the Sender MAC address is a port corresponding to a virtual Ethernet link between a local ED and the remote ED.

It may be seen from blocks 310 to 340 that, after the session cache item is updated at block 340, one of the Sender MAC address of the ARP request message and the Sender MAC address of the ARP response message is a local MAC address, the output port corresponding to the local MAC address is a local port through which a local ED accesses the local MAC address. The other is a remote MAC address of a remote site, and the corresponding output port is a port corresponding to the virtual Ethernet link between the local ED and the remote ED.

In other words, one of the first node and the second node is a local node of the ED, while the other is a remote node of the ED, and as such:

One of the first relationship and the second relationship is between a local MAC address and the output port corresponding to the local MAC address, in which the output port is a local port that the edge device accesses the local MAC address. And, The other relationship is between a remote MAC address and the output port corresponding to the remote MAC address, in which the output port is a port corresponding to a virtual Ethernet link between the edge device and a remote edge device.

Further, consider the following example scenarios:

If the first node sending the ARP request message is a local node and the second node sending the ARP response message is a remote node of the ED, the first relationship is between the local MAC address and its corresponding local output port; and the second relationship is between the remote MAC address and its corresponding Virtual Ethernet link.

If the first node sending the ARP request message is a remote node and the second node sending the ARP response message is a local node of the ED, the first relationship is between the remote MAC address and its corresponding Virtual Ethernet link; and the second relationship is between the local MAC address and its corresponding local port.

At block 360 in FIG. 3, the first relationship and the second relationship are provided to the data plane of the ED to facilitate data packet forwarding between the first node and the second node.

In one example, at block 362, advertisement of MAC addresses is not performed, in which case the first relationship and the second relationship in the session cache item are provided to the data plane. In this case, block 360 includes providing the following to the data plane to facilitate data packet forwarding:

A corresponding relationship between the Sender MAC address of the ARP request message and the first output port in the session cache item, i.e. the first relationship. And, A corresponding relationship between the Sender MAC address of the ARP response message and the second output port in the session cache item, i.e. the second relationship.

In another example, at block 364, advertisement of addresses is performed. As discussed, either the first node or the second node may be a local node of the ED, and the other is a remote node. The MAC address of the local node is the local MAC address, and the MAC address of the remote node is the remote MAC address. In this case, block 364 includes the following:

Advertising a local MAC address in the session cache item through the output port corresponding to the remote MAC address in the session cache item.

Receiving a remote MAC address advertised by another ED.

Providing the first relationship and the second relationship to the data plane to facilitate data packet forwarding between the first node and the second node.

In this case, one of the first relationship and the second relationship is a relationship between the local MAC address and an output port corresponding to the local MAC address in the session cache item, and the other relationship is a corresponding relationship between the received remote MAC address and a port through which the remote MAC address was received.

At block 364 in FIG. 3, the MAC address may be advertised by any suitable protocol used for advertising MAC address such as ISIS. The distribution of the local MAC address through the output port corresponding to the remote MAC address enables a peer ED of the virtual Ethernet link of the output port to receive the MAC address being advertised.

In addition, at block 360 in FIG. 3, providing the first relationship and the second relationship to the data plane is so as to create or store MAC address items including the relationships in the data plane.

According to block 362, the corresponding relationship between the Sender MAC address of the ARP request message and the first output port in the session cache item (first relationship) and the corresponding relationship between the Sender MAC address of the ARP response message and the second output port in the session cache item to the data plane (second relationship) are provided to the data plane.

According to block 364, one of the first relationship and the second relationship is the corresponding relationship between the advertised remote MAC address and the port through which the remote MAC address was received.

It should be noted that, in blocks 310 and 320 in FIG. 3, the ARP request message from the first node to the second node initiates a session of MAC address learning. Since a response to the ARP request message has not been captured yet, it may be regarded that the session is under establishment. After the ARP response message from the second node to the first node is captured, it may be regarded that the session of the MAC address learning has been established. For clarity, in the present disclosure, it is possible to configure the state of the session cache item in block 320 as a first state denoting that the MAC address learning session is under establishment. In this example, the first state may be a connecting state. After the Sender MAC address of the ARP response message and the second output port are added in the session cache item at block 340, the first state of the session cache item may be updated to a second state denoting that the MAC address learning session has been established. In this example, the second state may be a connected state.

In the following examples, the first state is referred to as the connecting or under establishment state, and the second state the connected or established state. Detailed descriptions will be given with reference to the examples in FIG. 4 and FIG. 5.

Figure 4:
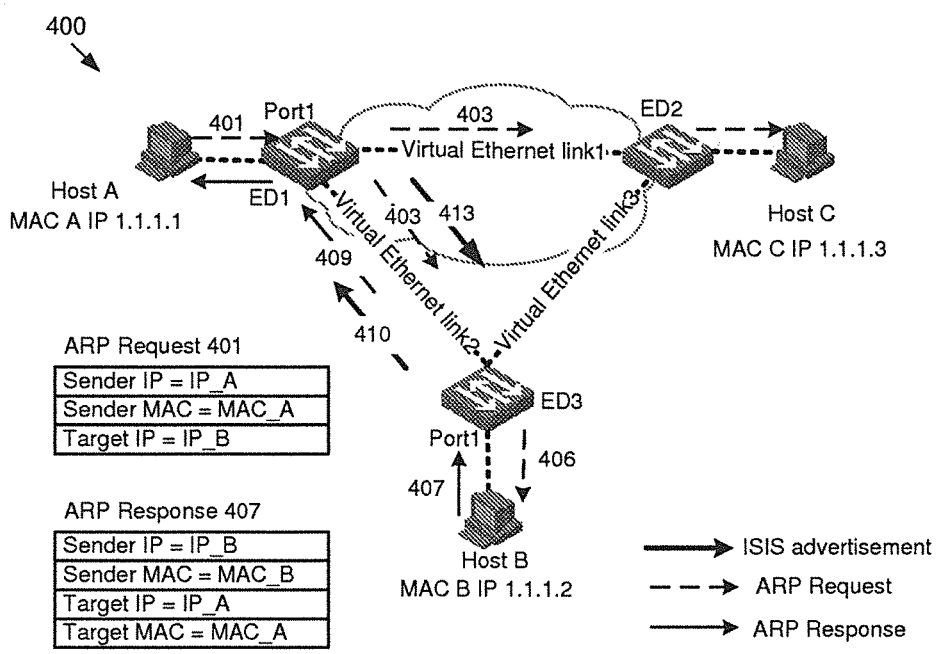
FIG. 4 is a schematic diagram illustrating a method according to an example of the present disclosure.

FIG. 4 is a schematic diagram 400 illustrating an example of the present disclosure according to blocks 310 to 360 and 364 (instead of 362) in FIG. 3. As shown in FIG. 4, each ED is enabled with an ARP snooping or capturing function. In this example, host A ("first node") needs to communicate with host B ("second node"). Since host A only knows the IP address of host B but not the MAC address of host B, host A needs to learn the MAC address of host B to be able to communicate with host B.

An example method for learning the MAC address of host B is as follows.

Host A broadcasts an ARP request message; see 401 in FIG. 4. The Target IP address of the ARP request is the IP address of host B (i.e. IP_B), the Sender IP address of the ARP request message is the IP address of host A (i.e. IP_A), and the Sender MAC address of the ARP request is the MAC address of host A, (i.e., MAC_A).

In FIG. 4, after the ARP request message is captured, each ED learns the contents carried by the ARP request message in a control plane, creates a session cache item locally based on the description of block 320 in FIG. 3, and configures the state of the session cache item to the connecting state. Thus, ED1, ED2, and ED3 in FIG. 4 each create a session cache item locally and identify the session cache item as the connecting state (i.e. first state).

Based on the ARP request message, ED1 creates a session cache item that includes: IP_A, IP_B, (MAC_A, Port1); see item 402 in FIG. 4. Port1 is a local port through which the ARP request message was captured by ED1. (MAC_A, Port1) denotes that MAC_A and Port1 have a corresponding relationship (i.e. first relationship).

Based on the ARP request message, ED2 creates a session cache item that includes: IP_A, IP_B, (MAC_A, Link1); see 403 and 404 in FIG. 4. Link1 denotes a port through which the ARP request message was captured by ED2. (MAC_A, Link1) denotes that MAC_A and Link1 have a corresponding relationship (i.e. first relationship).

Based on the ARP request message, ED3 creates a session cache item created by ED3 includes: IP_A, IP_B, (MAC_A, Link2); see 403 and 405 in FIG. 4. Link2 is a port through which the ARP request message was captured by ED3. (MAC_A, Link2) denotes that MAC_A and Link2 have a corresponding relationship (i.e. first relationship).

From the above, it will be appreciated that from ED1's perspective, the first relationship is the relationship between a local MAC address (MAC_A) and its corresponding output port (local port Port1). From ED2 and ED3's perspective, the first relationship is the relationship between a remote MAC address (MAC_A) and its corresponding output port (Virtual Ethernet links Link1 and Link2 respectively).

After the ARP request message is captured, each ED in FIG. 4 will forward the ARP request message to hosts under the ED; see 406.

After the ARP request message is received, host B in FIG. 4 finds that the Target IP address of the ARP request is its IP address. Host B returns an ARP response message such as by way of unicasting etc.; see 407 in FIG. 4. The Target MAC address of the ARP response message is MAC_A, the Target IP address is IP_A, the Sender MAC address is MAC_B, and the Sender IP address is IP_B. Since the Target IP address is not that of other hosts (such as host C), they do not respond to the ARP request message.

When ED3 in FIG. 4 captures the ARP response message 407 returned by host B on Port1, ED3 finds a session cache item including the Sender IP address of the ARP response message (i.e. IP_B) and the Target IP address of the ARP response message (i.e. IP_A) in local session cache items. In this example the found session cache item is: IP_A, IP_B, (MAC_A, Link2); see session cache item 405 of ED3 in FIG. 4. ED3 then updates the found session cache item by adding: a second relationship between the Sender MAC address of the ARP response message (i.e. MAC_B) and an output port corresponding to the Sender MAC address of the ARP response message (i.e. Port1). As such, the found session cache item is updated to be: IP_A, IP_B, (MAC_A, Link2), (MAC_B, Port1). (MAC_A, Link2) and MAC_B, Port1) are referred to as the first relationship and the second relationship in the session cache item 408 of ED3, respectively. At the same time, ED3 updates the state of the session cache item to the connected state (i.e. second state).

Then, ED3 transmits the ARP response message through the port (i.e. Link2) corresponding to the Target MAC address of the ARP response message (i.e., MAC_A) in the session cache item of the connected state; see 408 and 409. Further, in this example, ED3 advertises the local MAC address (i.e., MAC_B) through Link2, i.e., the port corresponding to the remote MAC address (i.e., MAC_A), in the session cache item of the connected state using ISIS; see 410 in FIG. 4.

In FIG. 4, ED3 is connected with ED1 through the virtual Ethernet Link2. Therefore, ED1 will receive the ARP response message forwarded by ED3 and the MAC_B advertised by ED3.

When the ARP response message is received from virtual Ethernet Link2, ED1 finds a session cache item including the Sender IP address and the Target IP address of the ARP response message: IP_A, IP_B, (MAC_A, Port1); see item 402 again. ED1 then updates the found session cache item by adding: the Sender MAC address of the ARP response message (i.e., MAC_B), and an output port corresponding to the Sender MAC address (i.e. Link2). As such, the found session cache item is updated to be: IP_A, IP_B, (MAC_A, Port1), (MAC_B, Link2); see item 411. (MAC_A, Port1) and (MAC_B, Link2) are referred to as the first relationship and the second relationship in the session cache item 411 of ED1, respectively. At the same time, ED1 updates the state of the session cache item to the connected state.

After ED1 updates the state of the session cache item to the connected state, if ED1 receives the MAC_B advertised by ED3 using ISIS through virtual Ethernet Link2, ED1 provides relationship (MAC_B, Link2) to the data plane to facilitate data packet forwarding between host A and host B. In this example, ED1 adds an item 412 in a MAC address forwarding table in the data plane that includes VPN1, the MAC address of remote node B (i.e. MAC_B) and the output port corresponding to MAC_B (i.e. Link2), as shown in the MAC address forwarding table of ED1 in FIG. 4. At the same time, ED1 advertises the local MAC address (i.e. MAC_A) in the session cache item through the output port corresponding to the remote MAC address (i.e. Link2) using ISIS; see 413. In addition, ED1 also forwards the ARP response message through the port (i.e. Port1), which corresponds to the Target MAC address (i.e. MAC_A) of the ARP response message.

In FIG. 4, ED1 is connected with ED3 through the virtual Ethernet Link2. Therefore, ED3 will receive the remote MAC address (i.e. MAC_A) advertised by ED1, as indicated at 413 in FIG. 4. After MAC_A advertised by ED1 using ISIS is received through Link2, ED3 provides relationship (MAC_A, Link2) to the data plane to facilitate data packet forwarding between host A and host B. In this example, ED3 creates or stores an item 414 in the MAC address forwarding table in the data plane that includes VPN1, the remote MAC address of host A (i.e. MAC_A) and the output port corresponding to MAC_A (i.e. Link2), as shown in the MAC address forwarding table of ED3 in FIG. 4.

From the above, at ED1, host A is a local node and host B is a remote node. The first relationship (MAC_A, Port1) provided to the data plane is the relationship between the local MAC address and its corresponding local port Port1. The second relationship (MAC_B, Link2) is the relationship between the remote MAC address and its corresponding Virtual Ethernet link. ED1 receives the remote MAC address (i.e. MAC_B) advertised by ED3 at 410 in FIG. 4, and advertises the local MAC address (i.e. MAC_A) to ED3 at 413 in FIG. 4.

On the other hand, at ED3, host B is a local node and host A is a remote node. The first relationship (MAC_A, Link2) provided to the data plane is the relationship between the remote MAC address and its corresponding Virtual Ethernet link. The second relationship (MAC_B, Port1) is the relationship between the local MAC address and its corresponding local port. ED3 advertises the local MAC address (i.e. MAC_B) to ED1 at 410 in FIG. 4, and receives the remote MAC address (i.e. MAC_A) advertised by ED1 at 413 in FIG. 4.

In FIG. 4, host A is connected with ED1 through Port1. Therefore, host A will receive the ARP response message. After the ARP response message is received, host A knows the MAC address of host B. Thereafter, data flows between host A and host B may be forwarded according to the MAC address.

Now, the method for learning the MAC address of host B is finished.

According to the example in FIG. 4, during the procedure of learning the MAC address of host B, ED2 is not related to host A and host B, which really need to communicate with each other. Therefore, ED2 merely creates a session cache item in the connecting state; see item 404 of ED2. ED2 will not advertise the MAC address in the session cache item of the connecting state to other sites using ISIS. Compared with the conventional systems, the examples disclosed herein improve the utilization ratio of MAC address item resources of the ED and reduces unnecessary occupation of MAC address items.

In FIG. 4, one ED advertises the MAC address after the state of the session cache item is updated to the second state (i.e. connected state), such that other EDs may create a MAC address item according to the advertised MAC address.

As an extension of FIG. 4, in the present disclosure, after the state of the session cache item is updated to further include the second relationship and its state to the connected state, the ED may not advertise the MAC address. Instead, the ED directly provides the MAC address and the output port in the session cache item to the data plane to instruct the data packet forwarding, as shown in FIG. 5.

Figure 5:
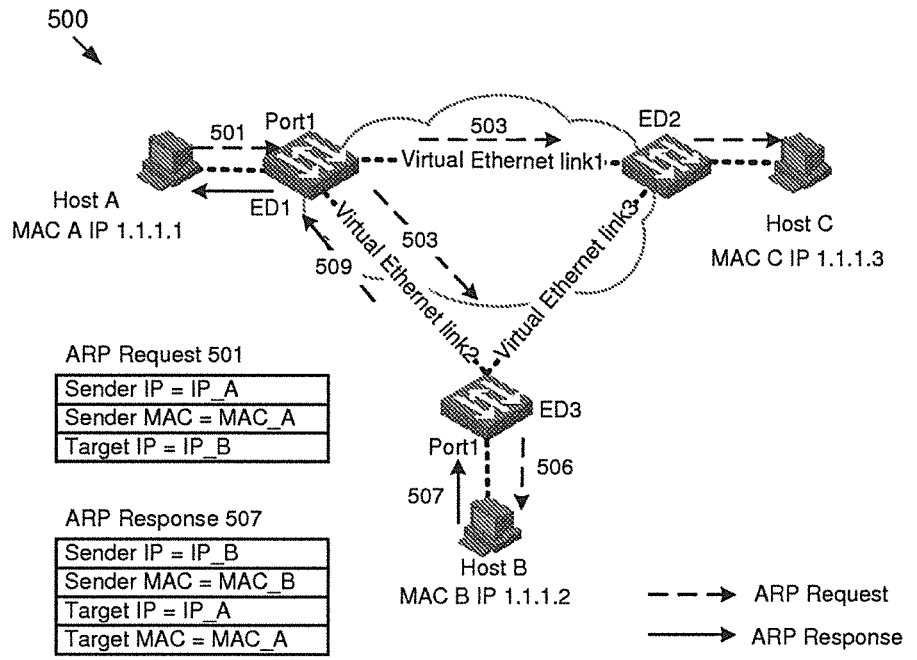
FIG. 5 is a schematic diagram illustrating a method according to another example of the present disclosure.

FIG. 5 is a schematic diagram 500 illustrating another example of the present disclosure according to blocks 310 to 360 and 362 (instead of 364) in FIG. 3. As shown in FIG. 5, each ED is enabled with the ARP snooping function. Similar to FIG. 4, host A needs to learn the MAC address of host B to communicate with host B. 501 to 509 in FIG. 5 correspond to 401 to 409 in FIG. 4 respectively, and their discussion is not repeated here.

The difference between the MAC address learning method shown in FIG. 5 and that shown in FIG. 4 is that: in FIG. 5, after one ED, such as ED3 or ED1, updates the session cache item to the connected state, the ED does not advertise the MAC address but directly provides the MAC addresses and the output ports in the session cache item to the data plane, so as to create or store MAC address items in the data plane to facilitate data packet forwarding between host A and host B. Hereinafter, ED3 is taken as an example. The discussion is similar for ED1.

After the session cache item is updated to the connected state (see 508 in FIG. 5), ED3 does not advertise the local MAC address in the session cache item (i.e. MAC_B) through the output port (i.e. Link2) that corresponds to the remote MAC address (i.e. MAC_A). Instead, ED3 directly provides the following to the data plane:
 (i) a first relationship (MAC_A, Link2), that is the relationship between the remote Sender MAC address MAC_A and the output port Link2 of the ARP request message in the session cache item 508; and
 (ii) a second relationship (MAC_B, Port1), that is the relationship between the local Sender MAC address MAC_B and the output port Port1 of the ARP response message in the session cache item 508 in the connected state.

The above are provided to the data plane to create a MAC address item of ED3 to facilitate data packet forwarding between host A and host B; see 510 in FIG. 5.

Similarly, ED1 directly provides the following to the data plane:
 (i) a first relationship (MAC_A, Port1), that is the relationship between the local Sender MAC address MAC_A and the output port Port1 of the ARP request message in the session cache item 511; and
 (ii) a second relationship (MAC_B, Link2), that is the relationship between the remote Sender MAC address MAC_B and the output port Link2 of the ARP response message in the session cache item 511 in the connected state.

The above are provided to the data plane to create a MAC address item of ED1 to facilitate data packet forwarding between host A and host B; see 512 in FIG. 5.

According to the example in FIG. 5, during the procedure of learning the MAC address of host B, ED2 is not related to host A and host B, which really need to communicate with each other. Therefore, ED2 merely creates a session cache item in the connecting state; see 504 in FIG. 5. In FIG. 5, after the session cache item is updated with the second relationship and its state to the connected state, the first relationship and second relationship (MAC addresses and the output ports) in the session cache item are provided to the data plane to create the MAC address item in the data plane. As such, ED2 will not create any MAC address item about the session cache item of the connecting state. As such, the examples disclosed herein improve the utilization ratio of MAC address item resources of the ED and reduce unnecessary occupation of MAC address items.

Host Migration

It should be noted that, since the host that the ED of each site accesses may migrate among different sites, each ED may further perform the following operations.

Receive a gratuitous ARP message broadcasted by a migrated host, in which each ED is enabled with the ARP snooping function and is able to capture the gratuitous ARP message, and the gratuitous ARP message is transmitted after the host is migrated successfully.

Find, in local session cache items, a session cache item containing an IP address of the migrated host.

If the found session cache item is currently configured to a first state, such as a connecting state, update the found session cache item according to the port through which the gratuitous ARP message was received. In the latter case, updating the found session cache item includes:
 (i) if the found session cache item does not contain the MAC address of the migrated host, add the MAC address of the migrated host and the output port corresponding to the MAC address of the migrated host in the found session cache item, and update the session cache item to the second state;
 (ii) otherwise, if the found session cache item contains the MAC address of the migrated host, update the output port corresponding to the MAC address of the migrated host in the session cache item to the port through which the gratuitous ARP message was received.

If the found session cache item is currently configured to the second state, such as a connected state, delete the found session cache item if the migrated host is located in a local site; and update the found session cache item if the migrated host is located in a remote site. In the latter case, updating the found session cache item includes:
 (i) if the output port corresponding to the MAC address of the migrated host in the session cache item is a local port, delete the found session cache item;
 (ii) if the output port corresponding to the MAC address of the migrated host in the found session cache item is a port corresponding to a virtual Ethernet link, update the output port corresponding to the MAC address of the migrated host in the session cache item to the port corresponding to the virtual Ethernet link through which the gratuitous ARP message was received.

Timers

It should be noted that, in order to save resources, in the present disclosure, each ED may further perform the following operations.

When the state of the session cache item is configured to the first state, start a first timer corresponding to the session cache item for identifying the first state of the session cache item.

When the state of the session cache item is updated from the first state to the second state, stop the first timer, and start a second timer corresponding to the session cache item for identifying the second state of the session cache item.

If any one of the first timer and the second timer expires, delete the session cache item corresponding to the timer. The expiry time of the first timer and that of the second timer are irrelevant with respect to each other.

Example Structures of Edge Device

Figure 6:
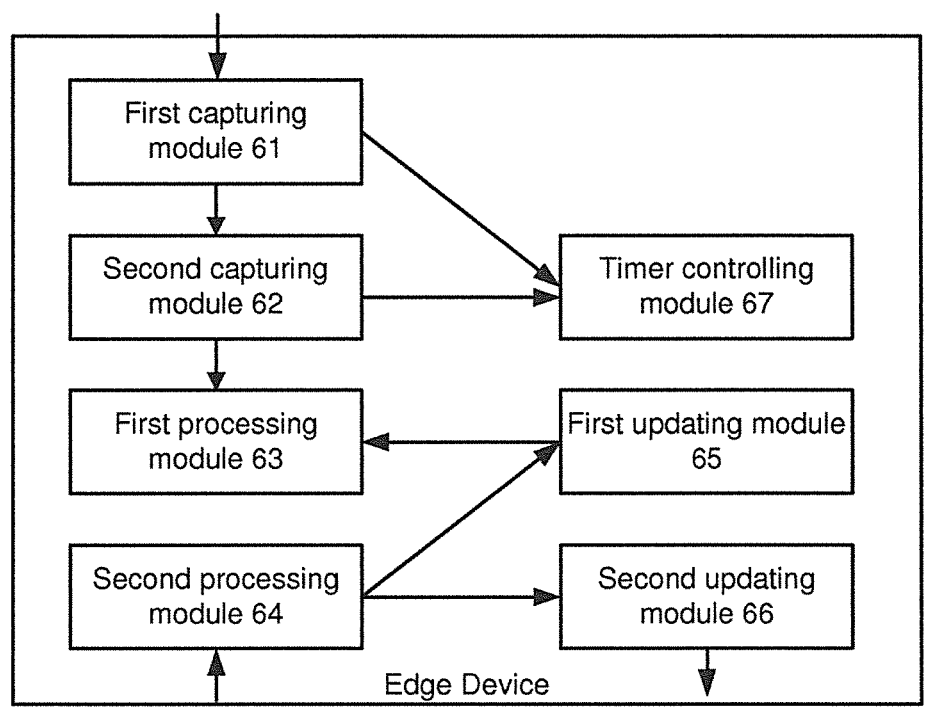
FIG. 6 is a schematic diagram illustrating a structure of an edge device according to an example of the present disclosure.

FIG. 6 is a schematic diagram illustrating a structure of an ED according to an example of the present disclosure. As shown in FIG. 6, the ED may include a first capturing module 61 to:

Capture an ARP request message from a first node to a second node.

Create, in a control plane of the ED, a session cache item containing the following contents:
- an IP address of the second node, that is a Target IP address of the ARP request message,
- an IP address of the first node, that is a Sender IP address of the ARP request message, and
- a first relationship between a MAC address of the first node (that is, a Sender MAC address of the ARP request message), and an output port corresponding to the MAC address of the first node (that is, an output port corresponding to the Sender MAC address).

The ED may also include a second capturing module 62 to capture an ARP response message from the second node to the first node.

The second capturing module 62 is further to: update the session cache item having the IP address of the first node (that is, a Target IP address of the ARP response message) and the IP address of the second node (that is, a Sender IP address of the ARP response message) to further include:
- a second relationship between a MAC address of the second node (that is, a Sender MAC address of the ARP response message) and an output port corresponding to the MAC address of the second node (that is, an output port corresponding to the MAC address of the ARP response message).

In this case, the second capturing module 62 may be further to find, in created session cache items, the session cache item with the Target IP address and the Sender IP address of the ARP response message before updating the found session cache item.

The second capturing module 62 is further to: forward the ARP response message through the output port corresponding to the MAC address of the first node in the session cache item (that is, Sender MAC address of the ARP request message). And, The second capturing module 62 is further to: transmit a notification to a first processing module 63.

The first processing module 63 is to: provide the first relationship and the second relationship to a data plane of the ED to facilitate data packet forwarding between the first node and the second node.

In one example, the first relationship and the second relationship in the session cache item are provided by the first processing module 63 to the data plane to facilitate data packet forwarding between the first node and the second node. In this case, the first processing module 63 provides, after the notification is received from the second capturing module 62, the following to the data plane:
- a relationship, being a first relationship, between the Sender MAC address and the output port of the ARP request message; and
- a relationship, being a second relationship, between the Sender MAC address and the output port of the ARP response message in the session cache item.

In another example, the first processing module 63 provides the first relationship and the second relationship to a data plane, as follows:
Advertise a local MAC address in the session cache item through an output port corresponding to a remote MAC address in the session cache item.
Receive a remote MAC address advertised by another ED. And,
Provide the first relationship and the second relationship to the data plane to facilitate data packet forwarding. In this case, one of the first relationship and the second relationship is a relationship between the local MAC address and an output port corresponding to the local MAC address in the session cache item, and the other is a relationship between the remote MAC address received and a port through which the remote MAC address was received.

The modules in the present disclosure may be implemented by software (e.g., machine readable instructions stored in a memory and executable by a processor), hardware (e.g., the processor of an ASIC), or a combination thereof. The session cache items and MAC address table may be stored in the memory.

One of the Sender MAC address of the ARP request message and the Sender MAC address of the ARP response message in the session cache item processed by the first processing module 63 is the local MAC address, and the output port corresponding to the local MAC address is a local port through which a local ED accesses the local MAC address. The other is the remote MAC address accessed by a remote ED. An output port corresponding to the remote MAC address is a port corresponding to a virtual Ethernet link between the local ED and the remote ED.

In other words, one of the first node and the second node is a local node of the edge device, while the other is a remote node of the edge device, and as such:
- One of the first relationship and the second relationship is between a local MAC address, and the output port corresponding to the local MAC address, in which the output port is a local port that the edge device accesses the local MAC address.
- The other relationship is between a remote MAC address, and the output port corresponding to the remote MAC address, in which the output port is a port corresponding to a virtual Ethernet link between the edge device and a remote edge device.

In this example, the first capturing module 61 is further to: configure a state of the session cache item to a first state after the session cache item is created, so as to indicate that the MAC address learning session is under establishment; and
after the Sender MAC address and the output port of the ARP response message are added to the session cache item, configure the state of the session cache item to a second state, so as to indicate that the MAC address learning session has been established, in which the session cache item processed by the first processing module 63 is the session cache item in the second state.

In this example, and as shown in FIG. 6, the ED further includes a second processing module 64, a first updating module 65, a second updating module 66, and a timer controlling module 67.

The second processing module 64 is to receive a gratuitous ARP message broadcasted by a migrated node or host and find a session cache item containing an IP address of the migrated host from local session cache items. If the found session cache item is currently configured to the first state, the second processing module 64 is to transmit a first update notification to the first updating module 65. If the found session cache item is currently configured to the second state, the second processing module 64 is to transmit a second update notification to the second updating module 66.

The first updating module 65 is to update, after the first update notification is received, the found session cache item according to the port through which the gratuitous ARP message was received. If the session cache item found does not contain the MAC address of the migrated host, the first updating module 65 is to add the MAC address of the migrated host and the output port corresponding to the MAC address of the host in the found session cache item, update the session cache item to the second state, and trigger the first processing module 63 to perform a corresponding operation. If the found session cache item contains the MAC address of the host, the first updating module 65 is to update the output port corresponding to the MAC address of the host in the session cache item to the port through which the gratuitous ARP message was received.

The second updating module 66 is to, after the second update notification is received, if the migrated host is currently local site accessed, delete the session cache item found; and if the migrated host is currently remote site accessed, update the found session cache item found. The found session cache item is updated by the second updating module 66 by: if the output port corresponding to the MAC address of the host in the session cache item is a local port, delete the found session cache item; if the output port corresponding to the MAC address of the migrated host in the found session cache item is a port corresponding to a virtual Ethernet link, update the output port corresponding to the MAC address of the migrated host in the session cache item to the port corresponding to the virtual Ethernet link through which the gratuitous ARP message was received.

The timer controlling module 67 is to start, when the state of the session cache item is configured to the first state, a first timer corresponding to the session cache item which is used for identifying the first state of the session cache item. The timer controlling module 67 is also to stop, when the state of the session cache item is updated from the first state to the second state, the first timer, and start a second timer corresponding to the session cache item, which is used for identifying the second state of the session cache item. The timer controlling module 67 is further to delete, if any one of the first timer and the second timer expires, the session cache item corresponding to the timer, in which the expiring time of the first timer and that of the second timer are irrelevant with respect to each other.

Now, the description to the structure of the edge device provided by the example of the present disclosure is finished.

Figure 7:
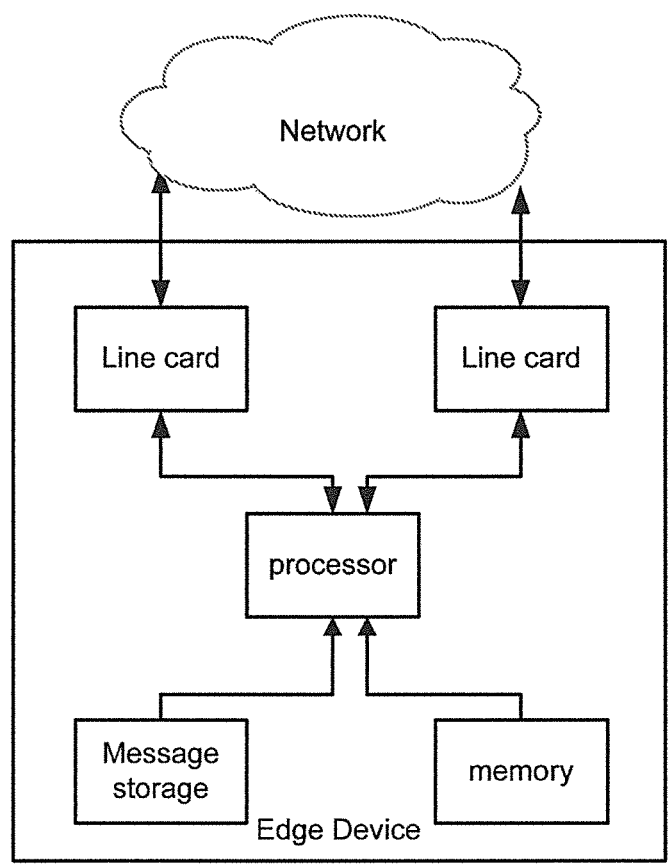
FIG. 7 is a schematic diagram illustrating a structure of an edge device according to another example of the present disclosure.

Hereinafter, a structure of an ED in a wireless network will be described according to an example of the present disclosure. The ED is a programmable device containing a combination of software and hardware, as shown in FIG. 7. The ED includes a processor to communicate with a memory and execute instructions in the memory. The memory is to store the instructions, in which the instructions are executed by the processor to perform all the operations of the ED as described above, which will not be repeated herein. The ED also includes line cards, each of which is to connect the ED to a network through an interface on the line card, in which the interface may be an Ethernet interface, a DSL interface, a Gigabit Ethernet interface, etc. The ED further includes a message storage to cache messages transmitted by the ED when the ED receives, processes, and forwards the messages, such that the ED processes the message in the message storage after an operation to the message is finished.

The memory is a machine-readable medium, including but not restricted to floppy disk, hard disk, compact disk (such as CD-ROM, CD-R, CD-RW, DVD-ROM, DVD-RAM, DVD-RW, DVD+RW), tape, non-volatile memory card, ROM, etc.

It should be noted that, the ED shown in FIG. 7 is merely an example. The ED may also be implemented on a device with a structure different from this example, which is not restricted in the present disclosure. The processor is to perform the operations discussed with reference to FIG. 3 to FIG. 6, including all operations by the first capturing module 61, second capturing module 62, first processing module 63, second processing module 64, timer controlling module 67, first updating module 65 and second updating module 66 in FIG. 6.

It may be seen from the description above that, in the present disclosure, after an ARP response message is captured, an ED finds, among local session cache items, the session cache item having the IP address of the first node and the IP address of the second node is updated.

The ED then provides the first relationship and the second relationship to a data plane of the edge device to facilitate data packet forwarding between the first node and the second node. According to examples in the present disclosure, EDs that are irrelevant to a communication between two nodes do not have to receive unnecessary MAC addresses. This increases the utilization ratio of MAC address item resources of the ED and reduces occupation by irrelevant MAC address items.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The above examples may be implemented by hardware, software, firmware, or a combination thereof. For example the various methods, processes and functional modules described herein may be implemented by a processor (the term processor is to be interpreted broadly to include a CPU, processing unit, ASIC, logic unit, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules be implemented as machine readable instructions executable by one or more processors, hardware logic circuitry of the one or more processors or a combination thereof. Further, the examples disclosed herein may be implemented in the form of a software product. The computer software product is stored in a non-transitory storage medium and comprises a plurality of instructions for making a computer device (which may be a personal computer, a server or a network device, such as a router, switch, access point, etc.) implement the method recited in the examples of the present disclosure.

The figures are only illustrations of an example, in which the modules or procedures shown in the figures are not necessarily essential for implementing the present disclosure. The modules in the aforesaid examples may be combined into one module or further divided into a plurality of sub-modules.

What is claimed is:

1. A method for learning a Medium Access Control (MAC) address, applied in an edge device in an interconnection network of data centers, said method comprising:
based on a receipt of a request message from a first node to a second node, creating by the edge device a session cache item, wherein the session cache item includes: an Internet Protocol (IP) address of the second node, an IP address of the first node, and a first relationship between a MAC address of the first node and a first port of the edge device through which the request message was received;
based on a receipt of a response message from the second node to the first node, updating, by the edge device, the session cache item having the IP address of the first node and the IP address of the second node, wherein the updated session cache item further includes a second relationship between a MAC address of the second node and a second port of the edge device through which the response message was received; and providing the first relationship and the second relationship to a data plane of the edge device to facilitate data packet forwarding between the first node and the second node.

2. The method of claim 1, further comprising: forwarding, by the edge device, the response message to the first node via the first port indicated in the session cache item.

3. The method of claim 1, wherein providing the first relationship and the second relationship to the data plane includes:
   advertising a local MAC address in the session cache item through the first port in the session cache item;
   receiving a remote MAC address advertised by another edge device; and
   providing the first relationship and the second relationship to the data plane;
   wherein one of the first relationship and the second relationship is between the local MAC address and first port in the session cache item, and the other relationship is between the received remote MAC address and a port through which the remote MAC address was received.

4. The method of claim 1, wherein:
   the first relationship is between a local MAC address and an output port corresponding to the local MAC address, in which the output port is a local port that the edge device accesses the local MAC address; and
   the second relationship is between a remote MAC address and an output port corresponding to the remote MAC address, in which the output port is a port corresponding to a link between the edge device and a remote edge device.

5. The method of claim 1, further comprising:
   after the session cache item is created to include the first relationship, changing the session cache item to a first state indicating that a MAC address learning session is under establishment;
   after the session cache item is updated with the second relationship, updating the session cache item from the first state to a second state indicating that the MAC address learning session has been established; and
   wherein the first relationship and the second relationship are provided to the data plane of the edge device when the session cache item is in the second state.

6. The method of claim 5, further comprising:
   receiving a message broadcasted by a migrated node,
   finding, in local session cache items, a session cache item containing an IP address of the migrated node, and
   if the found session cache item is in the first state, updating the found session cache item according to a port through which the message from the migrated node was received, and if the found session cache item is in the second state, deleting the found session cache item if the migrated node is currently a local node of the edge device, and updating the found session cache item if the migrated node is currently a remote node of the edge device.

7. The method of claim 6, wherein updating the found session cache item according to the port through which the message was received comprises:
   if the found session cache item does not contain a MAC address of the migrated node, adding the MAC address of the migrated node and an output port corresponding to the MAC address of the migrated node in the found session cache item, and updating the session cache item to the second state; and
   if the found session cache item contains the MAC address of the migrated node, updating the output port corresponding to the MAC address of the migrated node in the session cache item to the port through which the message was received.

8. The method of claim 6, wherein the updating the session cache item if the migrated node is currently a remote node of the edge device comprises:
   if an output port corresponding to a MAC address of the migrated node in the found session cache item is a local port, deleting the found session cache item; and
   if the output port corresponding to the MAC address of the migrated node in the found session cache item is a port corresponding to a link between the edge device and a remote edge device, updating the output port corresponding to the MAC address of the migrated node in the session cache item to the port corresponding to the link receiving the message.

9. The method of claim 5, further comprising:
   when the session cache item is changed to the first state, starting a first timer of the session cache item to indicate that the session cache item is in the first state;
   when the session cache item is updated from the first state to the second state, stopping the first timer, and starting a second timer of the session cache item to indicate that the session cache item is in the second state; and
   if the first timer or the second timer expires, deleting the session cache item corresponding to the timer that expires, wherein an expiry time of the first timer is irrelevant to that of the second timer.

10. An edge device in an interconnection network of data centers, comprising:
    a processor; and
    a non-transitory computer readable medium storing instructions that when executed by the processor cause the processor to:
    based on a receipt of a request message from a first node to a second node, create a session cache item, wherein the session cache item includes: an Internet Protocol (IP) address of the second node, an IP address of the first node, and a first relationship between a Medium Access Control (MAC) address of the first node and a first port of the edge device through which the request message was received;
    based on a receipt of a response message from the second node to the first node, update the session cache item having the IP address of the first node and the IP address of the second node, wherein the updated session cache item further includes a second relationship between a MAC address of the second node and a second port of the edge device through which the response message was received; and
    provide the first relationship and the second relationship to a data plane of the edge device to facilitate data packet forwarding between the first node and the second node.

11. The edge device of claim 10, wherein the instructions are to cause the processor to forward the response message to the first node via the first port indicated in the session cache item.

12. The edge device of claim 10, wherein when providing the first relationship and the second relationship to the data plane, the processor is further to:

advertise a local MAC address in the session cache item through a port corresponding to a remote MAC address in the session cache item;

receive a remote MAC address advertised by another edge device; and provide the first relationship and the second relationship to the data plane, wherein the first relationship is between the local MAC address and an output port corresponding to the local MAC address in the session cache item, and the second relationship is between the received remote MAC address and a port through which the remote MAC address was received.

13. The edge device of claim 10, wherein:

the first relationship is between a local MAC address and an output port corresponding to the local MAC address, in which the output port is a local port that the edge device accesses the local MAC address; and the second relationship is between a remote MAC address and an output port corresponding to the remote MAC address, in which the output port is a port corresponding to a link between the edge device and a remote edge device.

14. The edge device of claim 10, wherein the processor is further to:

after the session cache item is created to include the first relationship, change the session cache item to a first state indicating that a MAC address learning session is under establishment; and after the session cache item is updated with the second relationship, update the session cache item from the first state to a second state indicating that the MAC address learning session has been established;

wherein the first relationship and the second relationship are provided to the data plane of the edge device when the session cache item is in the second state.

15. The edge device of claim 10, wherein the processor is further to:

receive a message broadcasted by a migrated node, find, in local session cache items, a session cache item containing an IP address of the migrated node, and if the found session cache item is in the first state, update the found session cache item according to a port through which the message from the migrated node was received, and if the found session cache item is in the second state, delete the found session cache item if the migrated node is currently a local node of the edge device, and update the found session cache item if the migrated node is currently a remote node of the edge device.

* * * * *